United States Patent
Auvray et al.

(10) Patent No.: US 10,362,479 B2
(45) Date of Patent: Jul. 23, 2019

(54) MANAGEMENT OF ACCESS TO A PLURALITY OF SECURITY MODULES INCORPORATED INTO A DATA-PROCESSING DEVICE

(71) Applicant: ORANGE, Paris (FR)

(72) Inventors: Vincent Auvray, Tonneville (FR);
Sebastien Hallay, Evrecy (FR)

(73) Assignee: Orange, Chatillon (FR)

(*) Notice: Subject to any disclaimer, the term of this patent is extended or adjusted under 35 U.S.C. 154(b) by 0 days.

(21) Appl. No.: 14/652,090

(22) PCT Filed: Dec. 4, 2013

(86) PCT No.: PCT/FR2013/052944
§ 371 (c)(1),
(2) Date: Jun. 12, 2015

(87) PCT Pub. No.: WO2014/096608
PCT Pub. Date: Jun. 26, 2014

(65) Prior Publication Data
US 2015/0327066 A1    Nov. 12, 2015

(30) Foreign Application Priority Data

Dec. 20, 2012 (FR) .................................... 12 62436

(51) Int. Cl.
*H04L 29/06* (2006.01)
*H04W 12/06* (2009.01)
(Continued)

(52) U.S. Cl.
CPC ............ *H04W 12/06* (2013.01); *H04L 63/083* (2013.01); *H04W 8/183* (2013.01); *H04W 12/00405* (2019.01); *H04W 88/02* (2013.01)

(58) Field of Classification Search
CPC ...... H04W 12/06; H04W 8/183; H04L 63/083
See application file for complete search history.

(56) References Cited

U.S. PATENT DOCUMENTS 6,583,712 B1 * 6/2003 Reed .................. G07O 9/00103
340/5.21
6,889,059 B1 * 5/2005 Fragola ................ G06K 7/0034
379/114.17
(Continued)

FOREIGN PATENT DOCUMENTS

EP     2667646 A1 * 11/2013 ........... H04B 1/3816

*Primary Examiner* — Wasika Nipa
(74) *Attorney, Agent, or Firm* — Haverstock & Owens LLP

(57) ABSTRACT

The invention relates to a method for managing the use, in a terminal, of a plurality of security modules (SIM1, SIM2) managed by an entity (STK) capable of requiring the provision of security codes in order to unlock the modules. The method is characterized in that it comprises: a first phase of accessing the modules (PH1), including a step of receiving (ET13-1, ET13-2), by the entity, codes of the modules, a step of transmitting (ET14-1, ET14-2) the received codes to the security modules, followed by a step of storing (ET16), in a security module referred to as the main module, at least one code received by the entity relative to a module (SIM2) other than the main module; and a second subsequent access phase during which the unlocking of the main module is followed by a step of transmitting at least one code from the main module to at least one other security module (SIM2) corresponding to said at least one code.

6 Claims, 2 Drawing Sheets

(51) Int. Cl.
  *H04W 8/18* (2009.01)
  *H04W 88/02* (2009.01)
  *H04W 12/00* (2009.01)

(56) References Cited

U.S. PATENT DOCUMENTS

| | | | |
|---|---|---|---|
| 8,528,064 B2 * | 9/2013 | Nichols | G06F 21/41 726/5 |
| 8,700,848 B2 * | 4/2014 | Koraichi | G06F 21/335 235/380 |
| 2002/0154632 A1 * | 10/2002 | Wang | H04L 63/0428 370/389 |
| 2009/0061932 A1 | 3/2009 | Nagarajan | |
| 2009/0270072 A1 * | 10/2009 | Hsu | H04L 63/083 455/411 |
| 2012/0276955 A1 | 11/2012 | Venugopal | |
| 2013/0295998 A1 * | 11/2013 | Zheng | H04W 8/183 455/558 |

* cited by examiner

MANAGEMENT OF ACCESS TO A PLURALITY OF SECURITY MODULES INCORPORATED INTO A DATA-PROCESSING DEVICE

TECHNICAL FIELD

The invention relates to a method for managing access to a security module in a device incorporating a plurality of security modules.

The invention applies more particularly when the security module is a module whose use requires the input of a code before use.

Such a module is typically a SIM (Subscriber Identity Module) card delivered by a telecommunications operator in order to access its telecommunication network.

The SIM card in question requires the input of a PIN (Personal Identification Number) code before it is used.

The aforementioned device is more particularly a telephone, a smartphone or a tablet. In what follows, telephones will be used to illustrate an embodiment of the method of the invention.

PRIOR ART

The PIN code associated with a SIM card allows its use to be made secure. The SIM card is locked by default. Thus, when it is powered up at the start, the SIM card requires input of the PIN code; if the PIN code entered corresponds to that stored by the SIM card, the SIM card is unlocked and can be used by the terminal in which it is installed. Otherwise, the SIM card is unusable.

Some terminals currently incorporate a plurality of SIM cards, most often two or three cards.

As for terminals with one SIM card, these terminals with multiple SIM cards require a user to input the PIN codes of the various cards one after another when starting up the terminal; in the case in point, if the terminal incorporates two SIM cards, the user has to enter the code of the $1^{st}$ SIM card then secondly the PIN code of the $2^{nd}$ SIM card.

This repetitive procedure is carried out again each time the terminal is started up (i.e. when the SIM cards are started up), each time a SIM card is changed, and each time a mode known by the term "airplane mode" is exited. It should be recalled that the "airplane mode" makes it possible to deactivate the wireless functionalities of the terminal in order to comply with aviation regulations. Changing from this airplane mode to a normal mode requires the input of a PIN code.

This repetitive procedure may prove tedious or difficult when the user has a plurality of SIM cards, which is often the case in countries in which it is common practice to make use of various tariffs available from different telecommunications operators.

The invention offers a solution which does not have the drawbacks of the prior art.

THE INVENTION

To this end, according to one functional aspect, the invention relates to a method for managing the use, in a terminal, of a plurality of security modules managed by an entity capable of requesting the provision of security codes in order to unlock the modules, characterized in that it comprises
a first phase of accessing the modules, comprising a step of reception of the codes of the modules by the entity and a step of sending the received codes to the security modules, followed by a step of saving at least one received code in a security module referred to as the main module;
a subsequent second access phase during which unlocking of the main module is followed by a step of transmitting at least one code from the main module to at least one other security module corresponding to said at least one code.

The invention requests the input of all the codes only during first use; thereafter, during subsequent use, the input of a single code, namely that of the main module, is sufficient. Once the code of the main module has been entered, the main module transmits the code or codes to the other modules.

The modules form a set of modules. According to a first particular embodiment of the invention, the first access phase is carried out after a modification of said set. Thus, the first access step is carried out after addition, replacement or removal of at least one module. Specifically, after removal/replacement of modules, the codes stored in the main module are no longer up to date. This characteristic makes it possible to update the codes of the modules.

According to a second particular embodiment of the invention, which may be implemented as an alternative to or together with the embodiment above, the first access phase is carried out after reception of a message from at least one module indicating an incorrect code. This characteristic avoids provision in the terminal of a module detecting a physical modification in the terminal, in particular addition or removal of at least one module. The reception of a signal indicating that one (or more than one) PIN code is incorrect is sufficient to deduce that a change has taken place in the modules; if this is the case, the first phase is carried out again.

According to one physical aspect, the invention relates to a computer program capable of being implemented on comprising code instructions for carrying out the method as claimed in one of the preceding claims when this program is executed by a processor.

The nature of the aforementioned program is arbitrary. It may be downloaded from a communication network and/or saved on a computer-readable medium.

According to another physical aspect, the invention relates to an entity capable of being implemented in a terminal including a plurality of security modules which are capable of requesting the provision of the security codes in order to unlock the modules, characterized in that it comprises
a module for reception of the codes;
a module for transmission of the codes to an unlocked security module.

According to another physical aspect, the invention relates to a security module capable of being coupled to a terminal, said module being capable of being unlocked by means of a first security code, characterized in that it comprises
a module for receiving at least one second security code associated with at least one other module;
a module for storing said at least one second code;
a module for transmitting said at least one second code after it has been unlocked.

According to another physical aspect, the invention relates to a terminal comprising an entity as defined above and a plurality of security modules, including one as defined above.

The invention will be understood more clearly on reading the following description, given by way of example and provided with reference to the appended drawings, in which.

DETAILED DESCRIPTION OF AN EXEMPLARY EMBODIMENT ILLUSTRATING THE INVENTION

Figure 1:
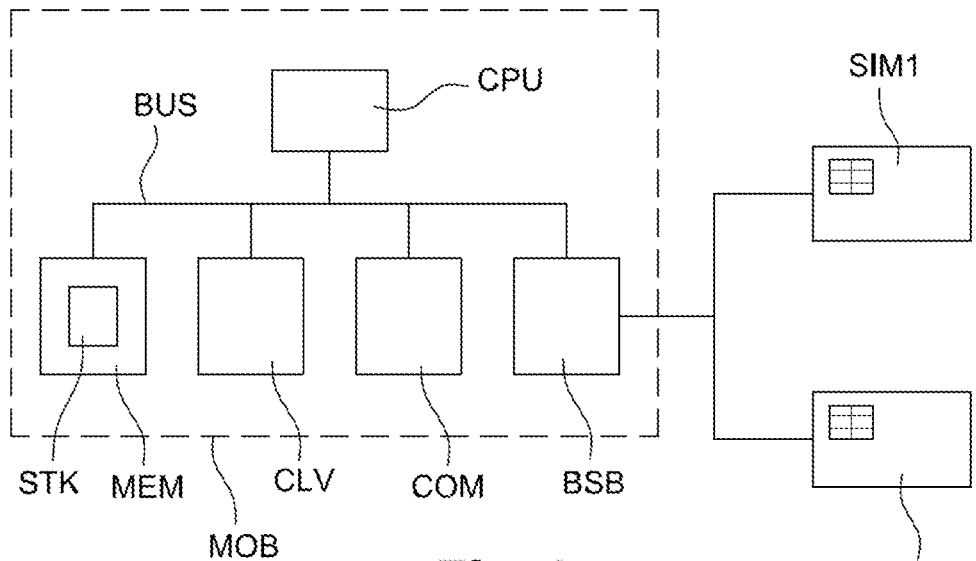
FIG. 1 is a schematic view of a terminal including a plurality of security modules.

FIG. 1 represents a terminal TRM provided, in our example, with two security modules illustrated by means of SIM cards.

The SIM cards are generally managed by telecommunications operators.

Let us recall that a SIM card is a chip comprising a microcontroller. It is used to store information specific to a user subscribed to a mobile network, particularly for networks of the GSM, UMTS and LTE type.

As explained above, the SIM card is locked by default. This locking of the SIM card (a function referred to as "SIM lock" by the person skilled in the art) allows the aforementioned operators to restrict the use of their mobile terminal (telephone) to one SIM card or a group of SIM cards.

These cards store standardized software known by the term "SIM Toolkit". Let us recall that the SIM Toolkit software allows applications executed on a SIM card to transmit instructions to the terminal, such as an instruction to display text on the screen of the terminal, etc. Reference may be made to the standard 3GPP TS 11.14 V8.18.0, entitled "3rd Generation Partnership Project; Specification of the SIM Application Toolkit for the Subscriber Identity Module—Mobile Equipment (SIM-ME) interface (Release 1999)", for further details about the operation of the SIM Toolkit software.

In our example, the terminal comprises
a processor CPU;
an input module for input of a security code; this module is for example a physical keypad CLV, although it could be a virtual keypad displayed on a touch screen;
a memory MEM capable of storing data; in particular, a part of the SIM Toolkit software making it possible to create a session referred to as a "proactive SIM session" in the aforementioned standard. This session involves a sequence of SIM Toolkit instructions and responses;
an interfacing module BSB capable of interfacing the processor CPU of the terminal and the SIM cards; this module is, for example, a baseband module ("baseband device") known to the person skilled in the art;
a communication module COM for communicating with a communication network such as a mobile network of the 3G or WIFI type.

The elements described above, as well as the microprocessor CPU, are connected to one another by means of a first bus BUS.

It should be noted that the function of the aforementioned buses is to ensure transfer of digital data between the various circuits connected to the microprocessor by a bus. In our example, the bus in question includes a data bus and a control bus.

It should also be noted that, in our example, the memories described above are nonvolatile memories accessible for reading and writing, for example of the flash type.

The terminals also include a respective random-access memory (not represented) for volatile storage of the calculation data used when carrying out a method according to the embodiments. These memories are not represented in the drawings because they are superfluous for the explanation of the invention.

The communication between the terminal and the network requires the input of codes. Specifically, each SIM card has a corresponding PIN code which a user has to enter on the terminal in order to unlock the SIM card. Once the SIM card is unlocked, a user can access a telecommunication network through the terminal.

Figure 2:
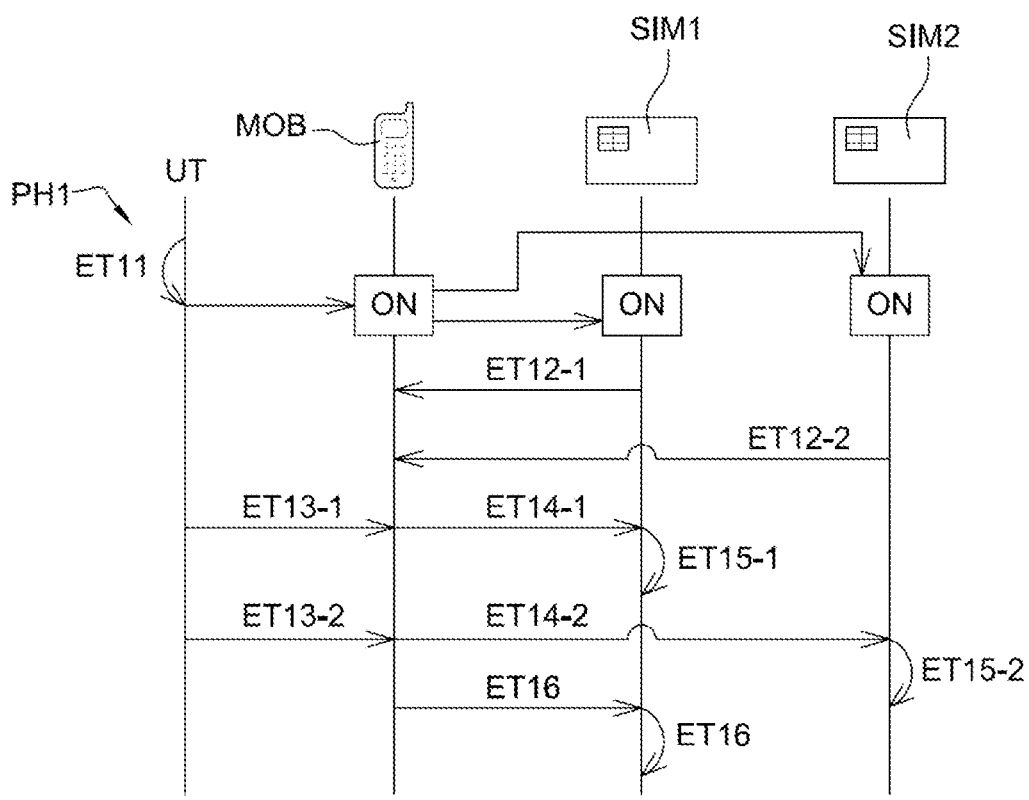
FIGS. 2 and 3 represent an embodiment of the method of the invention.
Figure 3:
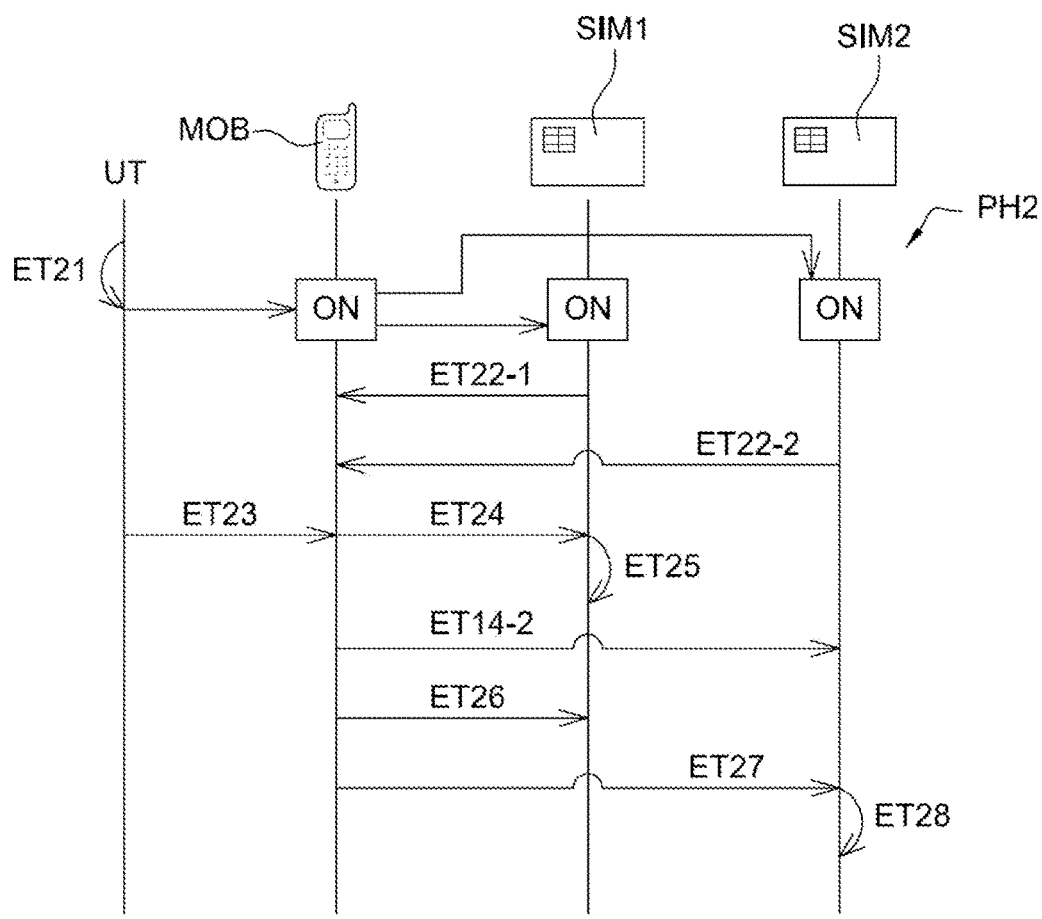

FIGS. 2 and 3 illustrate an embodiment of the invention in the form of data interchange.

The number of SIM cards is arbitrary; in order to simplify the explanation of the invention, however, in our example only two cards are installed in the terminal.

In this configuration, four axes are represented in FIGS. 2 and 3:
a first axis corresponds to the keypad of the terminal (i.e. to the user UT of the terminal);
a second axis corresponds to the terminal, or more precisely to the SIM Toolkit entity;
and two other axes corresponding to the two cards SIM1 and SIM2 present in the terminal, respectively.

The two cards together form a set of SIM cards.

Naturally, the interchanges described in FIGS. 2 and 3 represent only a subset of the interchanges which may take place.

The method according to the invention is divided into two main phases:
an initial phase PH1, the purpose of which is to provide the PIN codes in order to unlock the SIM cards and to store the entered codes;
a subsequent phase PH2 of unlocking the SIM cards according to an embodiment of the method of the invention.

The first phase PH1 comprises a plurality of steps referenced ET1$n$ or ET1$n$–k (n=1 to 5, k=1, 2), "n" referring to a particular step of this first phase and "k" referring to the card affected by the step "n" in question.

During a first step ET11 (ON), the user powers up the terminal. The entity STK is executed in order to manage the access to the various SIM cards. At this stage, the SIM cards are powered (ON) and initiate a respective start-up procedure.

During a second step ET12-1 and ET12-2, the entity STK receives PIN code input requests from the first and second cards, respectively. For each request, the entity STK asks the user to successively input the PIN codes.

During a third step ET13-1 and ET13-2, the user enters the codes PIN1 and PIN2 of the two cards, respectively.

Having received all the codes PIN1 and PIN2, the entity STK initiates two actions, which may be carried out simultaneously or in an uncorrelated fashion.

A first action involves, during a fourth step ET14-1 and ET4-2, sending entered codes to the cards so that the first and second cards are unlocked, respectively. For each SIM card, the unlocking consists in comparing the received PIN code with a PIN code stored in a memory of the SIM card; if they match, the card is unlocked and can be used, for example, to access the telecommunication network.

The assumption is made that the PIN codes entered are correct. During a step ET15-1 and ET15-2, the SIM cards are unlocked.

A second action involves transmission of the PIN codes from the entity to a card referred to as the "main card", which is selected from among the cards present in the terminal and can fulfil the function of a main card according to the principle of the invention. In our exemplary embodiment, the main SIM card selected is the first card SIM1. In this configuration, the entity transmits the code PIN2 of the second card SIM2 to the main card SIM1.

In our example, the code PIN2 is transmitted with the identifier ID-SIM2 of the card.

Subsequently, after the codes and corresponding identifiers have been saved in the main SIM card, we will assume that the user turns his terminal off.

The second phase PH2 comprises a plurality of steps referenced ET2$m$ or ET2$m$–k ($m$=1 to 7, k=1, 2), "m" relating to a particular step of this first phase and "k" relating to the card affected by the step in question.

The first steps ET21(ON), ET22-1, ET22-2, ET23, ET24 and ET25 are the same as those described with reference to the first phase PH1.

Following the fifth step, that is to say the unlocking of the main card, by virtue of a transmission module present in the main card the latter transmits the code of the second card SIM2, namely the code PIN2, to the entity STK during a sixth step ET26.

During a seventh step ET27, the entity STK transmits the second code PIN2 to the second card SIM2. If this code is correct, the second card SIM2 is unlocked during an eighth step ET28.

The example above is based on two SIM cards in order to simplify the explanation of the invention; the principle of the invention may, however, be extended to an arbitrary number of SIM cards. Let us assume that the terminal includes "n" SIM cards; in this configuration, each code is transmitted in association with an identifier ID-SIMk of the card in question:

ID-SIMk/code PINk
k=1 to n

Naturally, since the main card SIM1 knows its own code PIN1, this code, and the associated identifier ID-SIM1, is not transmitted by the entity to the main card when carrying out the second action described with reference to the first phase PH1.

According to one variant, the steps which have just been described during the first phase PH1 are carried out each time at least one card SIM is removed, added or replaced with another card. If this is the case, the first phase PH1 is executed again in order to store the new PIN code or codes in the main SIM card. To this end, the entity STK is capable of detecting any SIM card changes.

During the second phase PH2, if the entered PIN code relating to a card, in particular a card other than the main card SIM1, is incorrect; for example because the card in question is not the one declared during the first phase PH1; the card in question transmits a message, indicating that the code is incorrect, to the entity. According to one variant, the first phase is executed, preferably automatically without intervention by the user, following the reception of such a message.

The way in which the main card is selected is arbitrary. All or some of the cards may, for example, declare during the first phase that they can fulfil the function of a main card. If only one declared card can fulfil this function, it is automatically the main card. If a plurality of cards can fulfil this function, the entity may randomly select one card among this plurality of cards; alternatively, as a variant, it may interrogate the user so that he or she selects the main card among the plurality of aforementioned cards. Specifically, the user may favor one card over the others because this card has more chance of not being removed from the terminal compared with the other cards.

It was seen above that the method comprises
a step (ET13-1, ET13-2) of reception of the codes of the modules by the entity;
a step (ET14-1, ET14-2) of sending the received codes to the security modules, followed by a step (ET16) of saving in a security module, referred to as the main module, (ET16) of at least one code (PIN2) received by the entity and relating to a module (SIM2) other than the main module.

It should be pointed out that the sending step may be carried out equally well on reception of all the codes or on reception of each security code.

In order to carry out the method, the entity STK comprises
a module for reception of the codes;
a module for transmission of the codes to a security module.

In order to carry out the method, the SIM card comprises
a module for receiving at least one second security code associated with at least one other module;
a module for storing said at least one second code;
a module for transmitting said at least one second code after it has been unlocked.

It should be noted that the term "module" as used in this document may correspond either to a software component or to a hardware component, or alternatively to a set of hardware and/or software components, which are capable of carrying out the function or functions described for the module.

The invention claimed is:

1. A method for managing the use, in a terminal, of a first security module and a second security module managed by an entity able to communicate with the first security module and the second security module, the first security module and the second security module requesting provision of security codes in order to unlock the first security module and the second security module in order to access a telecommunication network, wherein the method comprises
a first phase of accessing the first security module and the second security module, comprising
a step of reception, by the entity, of a first received security code of the first security module and a second received security code of the second security module;
a step of sending the first received security code to the first security module and the second received security code to the second security module;
a step of comparing, in the first security module, the first received security code with a first stored security code stored in the first security module and, in the second security module, the second received security code with a second stored security code stored in the second security module; and
if the first received security code and the first stored security code match and the second received security code and the second stored security code match, a step of saving in the first security module, of the second received security code received by the entity and relating to the second security module; and
a subsequent second access phase during which unlocking of the first security module is followed by a step of transmitting the second received security code from the first security module to the second security module corresponding to the second received security code, wherein the first phase of accessing is carried out after reception of a message from at least one security module indicating an incorrect security code.

2. The method as claimed in claim 1, wherein the first security module and the second security module form a set of modules, and in that the first phase of accessing is carried out after a modification of said set of modules.

3. A non-transitory computer readable medium containing program instructions for causing a device to:
  manage the use, in a terminal, of a first security module and a second security module managed by an entity requesting provision of security codes in order to unlock the first security module and the second security module in order to access a telecommunication network, respectively, comprising:
    a first phase of accessing the first security module and the second security module, comprising
      a step of reception of a first received security code of the first security module and a second received security code of the second security module by the entity;
      a step of sending the first received security code to the first security module and the second received security code to the second security module;
      a step of comparing in the first security module, the first received security code with a first stored security code stored in the first security module and, in the second security module, the second received security code with a second stored security code stored in the second security module; and
      if the first received security code and the first stored security code match and the second received security code and the second stored security code match, a step of saving in the first security module, of the second received security code received by the entity and relating to the second security module; and
    a subsequent second access phase during which unlocking of the first security module is followed by a step of transmitting the second received security code from the first security module to the second security module corresponding to the second received security code,
  wherein the first phase of accessing is carried out after reception of a message from at least one security module indicating an incorrect security code.

4. An entity implemented in a terminal including a first security module and a second security module which request provision of a first security code and a second security code in order to unlock the first security module and the second security module in order to access a telecommunication network, wherein the entity comprises
  a hardware module for reception of the first security code of the first security module and the second security code of the second security module; and
  a hardware module for transmission of the first security code of the first security module and the second security code of the second security module to the first unlocked security module;
  wherein a first phase of accessing the first security module and the second security module, comprises
    reception of a first received security code of the first security module and a second received security code of the second security module by the entity;
    sending the first received security code to the first security module and the second received security code to the second security module;
    comparing in the first security module, the first received security code with a first stored security code stored in the first security module and, in the second security module, the second received security code with a second stored security code stored in the second security module; and
    if the first received security code and the first stored security code match and the second received security code and the second stored security code match, a step of saving in the first security module, of the second received security code received by the entity and relating to the second security module; and
  wherein a subsequent second access phase comprising unlocking of the first security module is followed by a step of transmitting the second received security code from the first security module to the second security module corresponding to the second received security code; and further wherein the first security module and the second security module form a set of modules, and the first phase of accessing is carried out after reception of a message from at least one security module indicating an incorrect security code.

5. A security module card coupled to a terminal, a first security module being able to be unlocked by means of a first security code, wherein the security module card comprises
  a non-transitory computer-readable medium storing:
    a reception module for receiving at least one second security code associated with a second security module;
    a storage module for storing the second security code; and
    a transmission module for transmitting said second security code to the second security module after said first security module has been unlocked;
  wherein a first phase of accessing the first security module and the second security module, comprises
    reception of a first received security code of the first security module and a second received security code of the second security module by the security module card;
    sending the first received security code to the first security module and the second received security code to the second security module;
    comparing in the first security module, the first received security code with a first stored security code stored in the first security module and, in the second security module, the second received security code with a second stored security code stored in the second security module; and
    if the first received security code and the first stored security code match and the second received security code and the second stored security code match, a step of saving in the first security module, of the second received security code received by the security module card and relating to the second security module; and
  wherein a subsequent second access phase comprising unlocking of the first security module is followed by a step of transmitting the second received security code from the first security module to the second security module corresponding to the second received security code; and further wherein the first security module and the second security module form a set of modules, and the first phase of accessing is carried out after reception of a message from at least one security module indicating an incorrect security code.

6. A terminal comprising an entity and a first security module and a second security module which request provision of a first security code and a second security code in order to unlock the first security module and the second security module in order to access a telecommunication network, respectively, wherein the terminal comprises
- a non-transitory computer-readable medium storing:
  - a module for reception of a first received security code of the first security module and a second received security code of the second security module by the entity;
  - a module for sending the first received security code to the first security module and the second received security code to the second security module;
  - a module for saving, when the first received security code matches with a first stored code stored in the first security module and the second received security code matches with a second stored code stored in the second security module, in the first security module, of the second received security code received by the entity and relating to the second security module; and
  - a module for transmitting, each time the first security module is unlocked, the second received security code from the first security module to the second security module corresponding to the second received security code;
- wherein a first phase of accessing the first security module and the second security module, comprises
  - reception of a first received security code of the first security module and a second received security code of the second security module by the entity;
  - sending the first received security code to the first security module and the second received security code to the second security module;
  - comparing in the first security module, the first received security code with a first stored security code stored in the first security module and, in the second security module, the second received security code with a second stored security code stored in the second security module; and
  - if the first received security code and the first stored security code match and the second received security code and the second stored security code match, a step of saving in the first security module, of the second received security code received by the entity and relating to the second security module; and
- wherein a subsequent second access phase comprising unlocking of the first security module is followed by a step of transmitting the second received security code from the first security module to the second security module corresponding to the second received security code; and further wherein the first security module and the second security module form a set of modules, and the first phase of accessing is carried out after reception of a message from at least one security module indicating an incorrect security code.

* * * * *